(12) United States Patent
Blumer et al.

(10) Patent No.: US 9,183,441 B2
(45) Date of Patent: Nov. 10, 2015

(54) VEHICLE DATA COLLECTION AND VERIFICATION

(71) Applicant: Vehcon, Inc., Atlanta, GA (US)

(72) Inventors: Frederick T. Blumer, Atlanta, GA (US); Joseph R. Fuller, Mableton, GA (US)

(73) Assignee: Vehcon, Inc., Atlanta, GA (US)

( * ) Notice: Subject to any disclaimer, the term of this patent is extended or adjusted under 35 U.S.C. 154(b) by 34 days.

(21) Appl. No.: 13/829,140

(22) Filed: Mar. 14, 2013

(65) Prior Publication Data

US 2013/0345896 A1 Dec. 26, 2013

Related U.S. Application Data

(60) Provisional application No. 61/663,756, filed on Jun. 25, 2012, provisional application No. 61/696,116, filed on Aug. 31, 2012.

(51) Int. Cl.
*G05D 1/00* (2006.01)
*G08G 1/123* (2006.01)
*G06K 9/00* (2006.01)

(52) U.S. Cl.
CPC .............. *G06K 9/00624* (2013.01); *G06K 9/00* (2013.01); *G06K 2209/03* (2013.01)

(58) Field of Classification Search
CPC ..... G06F 9/4401; G06F 21/44; G06F 21/572; G06F 2009/45587; G06F 21/64; G01N 25/72; G06K 2209/03; G06K 9/00; G06K 9/00624

USPC ....................... 701/1, 400–541; 340/988–996
See application file for complete search history.

(56) References Cited

U.S. PATENT DOCUMENTS

| | | | |
|---|---|---|---|
| 5,970,481 A | 10/1999 | Westerlage et al. | |
| 7,551,783 B2 * | 6/2009 | Johnson et al. | 382/209 |
| 7,890,355 B2 * | 2/2011 | Gay et al. | 705/4 |
| 8,653,953 B2 * | 2/2014 | Biondo et al. | 340/425.5 |
| 2003/0138146 A1 * | 7/2003 | Johnson et al. | 382/190 |
| 2007/0282735 A1 * | 12/2007 | Schuebert | 705/38 |
| 2011/0227942 A1 * | 9/2011 | Fujimoto et al. | 345/619 |
| 2011/0281564 A1 | 11/2011 | Armitage et al. | |
| 2011/0317885 A1 * | 12/2011 | Leung et al. | 382/118 |
| 2013/0144482 A1 * | 6/2013 | Tuukkanen | 701/29.6 |
| 2013/0239205 A1 * | 9/2013 | Jacobs et al. | 726/19 |

FOREIGN PATENT DOCUMENTS

| | | |
|---|---|---|
| WO | WO 2008076463 A1 | 6/2008 |
| WO | WO 2010118506 A1 | 10/2010 |

OTHER PUBLICATIONS

PCT International Search Report and Written Opinion of application PCT/US2013/047307 dated Sep. 25, 2013, 10 pages.

* cited by examiner

*Primary Examiner* — Muhammad Shafi
(74) *Attorney, Agent, or Firm* — Thomas|Horstemeyer, LLP

(57) ABSTRACT

Disclosed are various embodiments for a data aggregation application. Operational data and image data may be captured from a client device. Odometer readings can be extracted from the image data. The operational data and image data can be verified by comparing an instrument panel depicted in the image data to a known instrument panel depiction.

16 Claims, 4 Drawing Sheets

VEHICLE DATA COLLECTION AND VERIFICATION

PRIORITY INFORMATION

This application claims priority from U.S. Provisional Applications 61/663,756, "Image-Based Vehicle Odometer Reporting and Associated Data Collection," and 61/696,116, "Authentication of Image-Derived Vehicle Data," which are hereby incorporated by reference in their entirety, as if fully set forth herein.

BACKGROUND

Obtaining data relating to vehicles such as odometer readings and operator behavioral data can be beneficial to issuers of insurance policies and other service providers. Using specialized sensors or devices to perform the verification adds additional costs and complications for a user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Insurance policies for automobiles are often issued for a particular automobile owned by a customer. The terms and conditions of an insurance policy may be dependent on the type of automobile covered by the policy. For example, an insurance policy for an automobile known to have greater safety risks may require a higher premium when compared to a policy for a lower risk automobile. The terms and conditions of the insurance policy may also be dependent on driving habits of a user. For example, the policy issuer may offer incentives for customers who drive a limited distance, limit their driving speed to a predefined limit, or maintain their automobiles in proper working condition. Additionally, incentives or discounts may be offered to vehicle operators who refrain from certain behaviors, such as operating a mobile phone during operation of the vehicle.

Monitoring the type, operation, and mileage of an automobile may be performed by implanting proprietary sensors into the automobile. This comes at a financial cost to either the insurance company or the customer to cover the cost of the sensors and their installation. Additionally, a customer may be discouraged from installing the sensors for fear of impacting the automobile's performance, or reducing the resale value of the automobile.

By using sensors commonly available in mobile devices such as mobile phones, a data aggregation application can obtain images of an operated vehicle and other data from a client device. For example, a client can submit a picture of an instrument panel such as a dashboard from which an odometer reading is extracted. Data embodying driving habits can be generated from global positioning system data, accelerometer data, cellular or other wireless connections, and potentially other data. Behavior patterns such as talking, texting, or otherwise operating the mobile device can also be detected.

A service provider wishing to aggregate this data may also wish to verify the integrity of the data. To this end, the data aggregation application may verify that the automobile from which the data is captured corresponds to the automobile or type or class of automobile covered by the service. This may be performed by detecting a unique identifier captured by image data, such as a vehicle identification number. This may also be performed by comparing an image of a captured instrument panel to a knowledge base of identified instrument panels. The application may also detect whether an image has been altered or modified after being captured. Other approaches may also be used to verify the integrity of the data.

In the following discussion, a general description of the system and its components is provided, followed by a discussion of the operation of the same.

Figure 1:
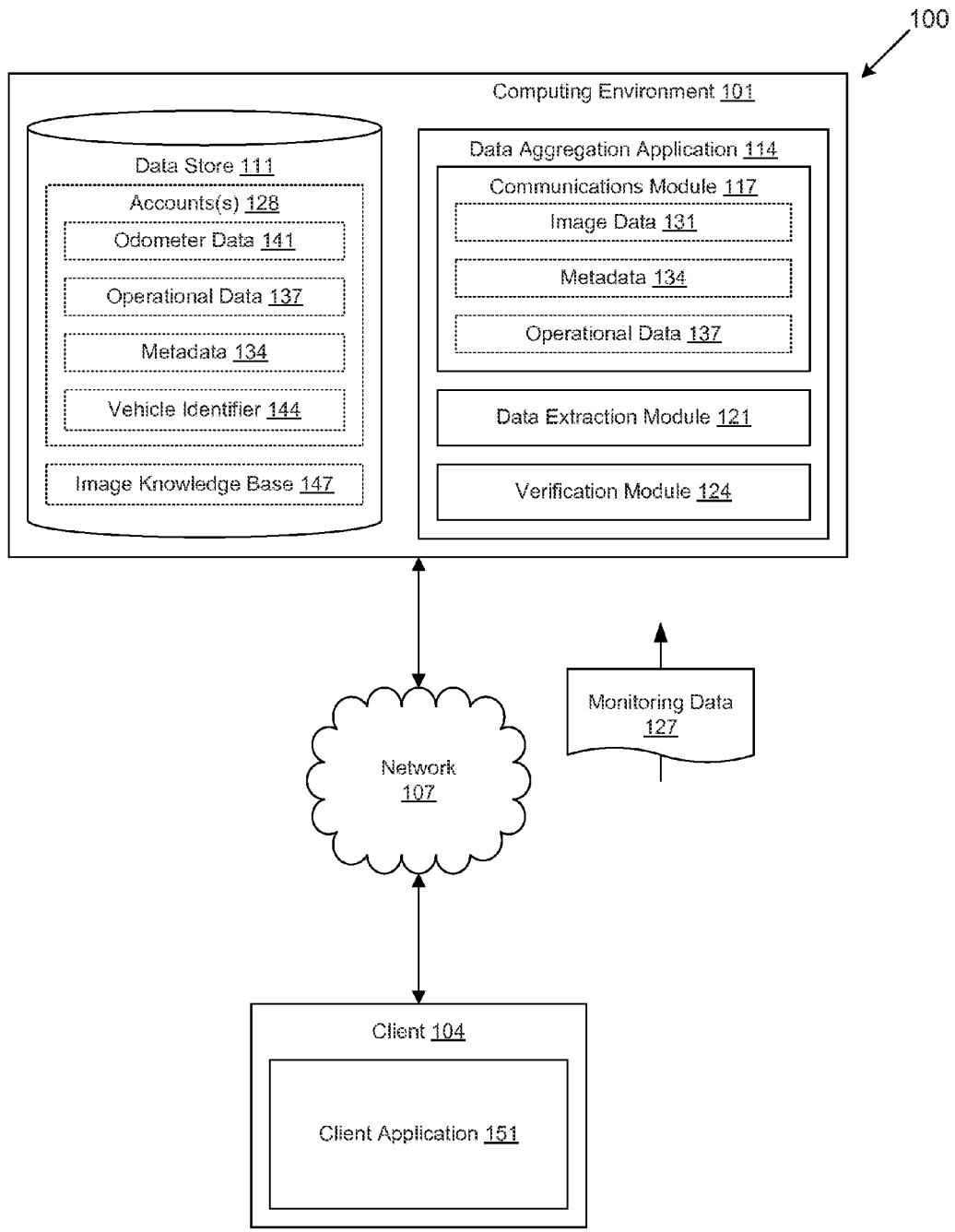
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system or device providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data store can be anywhere on any one or more storage devices in the environment 100 and accessible to or by the computing environment 101. The data stored in the data store 111, for example, is associated with the operation of the various applications and/or or functional entities described below.

The components executed on the computing environment 101, for example, can include a data aggregation application 114 having a communications module 117, a data extraction module 121, and a verification module 124, and other applications, services, processes, systems, engines, or functionality not discussed in detail herein. The data aggregation application 114 is executed to obtain monitoring data 127 from a client 104 to be associated with a user account 128.

For example, the monitoring data 127 may comprise image data 131 capturing an image of at least one component of a vehicle. For example, the image data 131 may depict an instrument panel such as a dashboard or a meter such as an odometer. The image data 131 may also capture some identifier affixed to a vehicle, such as a vehicle identification number (VIN) or other identifier. The identifier may be represented as an alphanumeric value, barcode, Quick Response (QR code), or another representation.

The image data 131 may be encoded as a single frame image, or as a multiple frame movie file. Additionally, the image data 131 may be encoded with or otherwise associated with metadata 134. Metadata 134 associated with the image data 131 may comprise, without limitation, a date or time at which the image data 131 was generated or data indicative of a location at which the image data 131 was generated. Metadata 134 associated with the image data 131 may also comprise an identifier of a client 104 or other device which generated the image data 131, a camera resolution or shutter speed, or other characteristics of the image data 131 or a device for generating the image data 131.

The image data 131 may be captured by a component of a client 104 such as a built-in or peripheral camera. The image data 131 may also be generated by another device and then communicated to the data aggregation application 114. For example, the image data 131 may be generated by a dedicated digital camera, and then transferred to or otherwise made accessible to a client 104 for communication to the data aggregation application 114.

The monitoring data 127 may also comprise operational data 137 indicative of vehicle operations, date, time and duration of vehicle operation, or operator behavior patterns with respect to a vehicle. For example, operational data 137 may comprise data generated by an accelerometer, clock, or global positioning system (GPS) radio sensor accessible to the client 104. The accelerometer, clock, GPS radio or other sensor used to generate the operational data 137 may be a component of the client 104, or a sensor distinct from but otherwise accessible to the client 104. For example, the client 104 may be in communication with a GPS radio built in to the vehicle for obtaining GPS data for inclusion in the operational data 137.

The operational data 137 may also comprise usage data relating to an operation of the client 104. For example, in embodiments in which the client 104 comprises a mobile phone, the operational data 137 may include data representing talking, texting, internet accessing, or other actions taken by the client 104. A variety of sensors may thus be used to generate operational data 137, for example a magnetometer, a gyroscope, a global positioning device or other sensor. For example, location operational data 137 may be determined by use of cell tower data or tower triangulation, involving a data source and/or a backend system apart from a location sensor.

The monitoring data 127 may also comprise additional metadata 134 related to the monitoring data 127, the client 104, or the associated vehicle. For example, the metadata 134 may comprise hardware component data, operating system or software version data, wireless carrier or network information, or other data associated with the client 104. The metadata 134 may also comprise account, session, or login information associated with a user of the client 104. The metadata 134 may further comprise data embodying cellular towers, wireless access points, or other networking components to which the client 104 has connected. The metadata 134 may also comprise other data as well.

The monitoring data 127 may then be stored with respect to an account 128. Storing the monitoring data 127 may be performed responsive to a successful verification by the verification module 124 or responsive to some other criteria.

A smart mobile device may be used for sensing or obtaining the monitoring data 127. Examples of a suitable smart mobile device include smart mobile phones, tablets, personal digital assistants (PDA's), or other portable devices with electronic processing capability. Such devices may include any one or more sensors for sensing a characteristic of the vehicle to be monitored such as an automobile. For example, such devices may include one or more sensors such as an audio, motion, vibration, orientation and location sensors.

The data extraction module 121 generates additional data from the monitoring data 127 obtained by the communications module 117. For example, the data extraction module 121 may apply a text or optical recognition function to an image data 131 depicting an instrument panel or odometer to generate odometer data 141 indicative of an odometer reading at the time at which the image data 131 was generated. The data extraction module 121 may also apply a text or optical recognition algorithm, QR code recognition algorithm, barcode recognition algorithm, or other image analysis algorithm to extract a vehicle identifier 144 from the image data 131. The vehicle identifier 144 comprises an encoding of a unique identifier associated with a vehicle, such as a VIN, as well as potentially data embodying a year, make, model and color of a vehicle, or other data.

The data extraction module 121 may also infer or detect unsafe operational behavior patterns from the operational data 131. For example, operational data 131 comprising GPS or cell tower data indicating a moving vehicle at a time during which further operational data 131 indicates texting or talking via a client 104 may indicate that a vehicle operator was texting during operation. As another example, GPS operational data 137 indicating a particular movement distance may be correlated with odometer data 141 to detect deviations between reported and detected mileage. Other data may also be generated by the data extraction module 121.

Data extracted by the data extraction module 121 such as odometer data 141 or a vehicle identifier 144 may then be stored with respect to an account 128. Storing this data may be performed responsive to a successful verification by the verification module 124 or responsive to some other criteria.

The verification module 124 verifies the integrity of the monitoring data 127 to confirm that the monitoring data 127 was obtained from or embodies a vehicle associated with an account 128. For example, the verification module 124 may compare a vehicle identifier 144 generated by the data extraction module 121 and compare that value to a vehicle identifier 144 stored with respect to an account 128.

In another embodiment, the verification module 124 may determine if an image data 131 embodying an instrument panel or dashboard corresponds to a vehicle identifier 144 stored with respect to an account 128. This may comprise, for example, comparing the image data 131 to an image knowledge base 147 storing image data 131 of instrument panels or dashboards corresponding to the vehicle identifier 144. Entries in the image knowledge base 147 may depict the instrument panel of the vehicle defined by the vehicle identifier 144. For example, upon account 128 creation, one or more instances of image data 131 may be captured for the instrument panel of the vehicle for later comparison. In some embodiments, entries in the image knowledge base 147 may comprise instrument panels or dashboards of vehicles sharing a like make, model, or year with respect to the vehicle defined by the vehicle identifier 144. Comparisons of image data 131 to an image knowledge base 147 may be performed by a machine learning algorithm, such as but not limited to a support vector machine (SVM). Comparisons of image data 131 to an image knowledge base 147 may also be performed by an image comparison or matching algorithm or other algorithm as can be appreciated.

Image knowledge base 147 entries may be specifically developed for use by the data aggregation application 114 or may be captured from publicly available sources such as the Internet. The image knowledge base 147 may be stored locally within the environment of the present system or remotely (for example in a cloud-based system) or simply obtained by searching or crawling publicly available data bases.

The verification module 124 may also perform login or other identity verifications associated with a submission of monitoring data 127. This may comprise performing password verifications, security question verification, facial recognition or other identity verifications. This may also comprise comparing metadata 134 of the monitoring data 127 to known attributes of the account 128. For example, an account 128 may be associated with a defined client 104 identified by some unique identifier or hardware specification embodied in metadata 134. The verification module 124 may then compare the metadata 134 of the monitoring data 127 to the known client 104 parameters associated with the account 128.

The verification module 124 may also check the integrity of image data 131 to determine if the image data 131 was altered or otherwise modified prior to submission to the data aggregation application 114. This may comprise, for example, performing edge detection, artifact detection, pixel pattern detection, or other method to detect image modifications as can be appreciated.

The verification module 124 may also verify the integrity of a generated odometer data 141 as being greater than or equal to a previously generated odometer data 141 or a known odometer data 141 associated with a temporally earlier time with respect to the generated odometer data 141.

The data stored in the data store 111 includes, for example, accounts 128 having one or more of an odometer data 141, operational data 137, metadata 134, or a vehicle identifier 144. The accounts 128 may be stored in a relational database or in another data structure as can be appreciated. An image knowledge base 147 may also be stored in the data store 111.

The client 104 is representative of a plurality of client devices that may be coupled to the network 107. The client 104 may comprise, for example, a processor-based system such as a computer system. Such a computer system may be embodied in the form of, a laptop computer, personal digital assistants, cellular telephones, smartphones, personal navigation devices, music players, web pads, tablet computer systems, electronic book readers, or other mobile devices with electronic processing capability. Although the client 104 comprises a smartphone in a preferred embodiment, it is understood that the client 104 may comprise any device with like capability.

The client 104 may be configured to execute various applications such as a client application 151 and/or other applications. The client application 151 is executed to generate monitoring data 127 associated with a vehicle. This may comprise, for example, generating image data 131 from a built-in or peripheral camera or obtained from another device. The client application 151 may also generate operational data 131 by accessing sensors including a GPS sensor, cellular network radio, other network radio, accelerometer, or other sensors. Such sensors may be components of the client 104 or remotely accessible to the client 104.

The client application 151 also facilitates the communication of monitoring data 127 to the data aggregation application 114. The monitoring data 127 may be communicated responsive to user input, responsive to an electronic message received from an external system or computing environment including without limitation computing environment 101, at a predefined interval, or at a predefined time. The client application 151 may also restrict generation or communication of monitoring data 127 to predefined conditions, such as the client 104 being connected to a power supply, or other conditions. The conditions may be predefined by the client application 151 or defined as a user preference.

Figure 2:
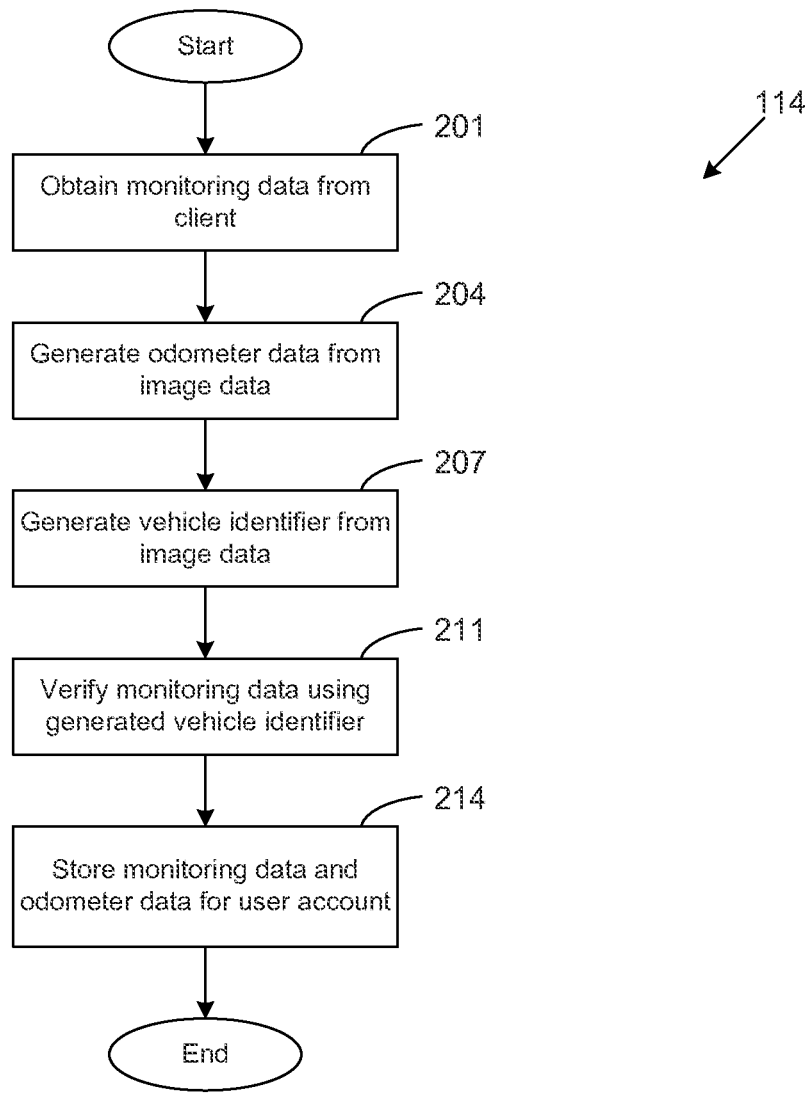
FIG. 2 is a flowchart illustrating one example of functionality implemented as portions of a data aggregation application executed in a computing environment in the networked environment of FIG. 1 according to various embodiments of the present disclosure.

Referring next to FIG. 2, shown is a flowchart that provides one example of the operation of a portion of the data aggregation application 114 (FIG. 1) according to various embodiments. It is understood that the flowchart of FIG. 2 provides merely an example of the many different types of functional arrangements that may be employed to implement the operation of the portion of the data aggregation application 114 as described herein. As an alternative, the flowchart of FIG. 2 may be viewed as depicting an example of steps of a method implemented in the computing environment 101 (FIG. 1) according to one or more embodiments.

Beginning with box 201, the data aggregation application 114 obtains monitoring data 127 (FIG. 1) via a network 107 (FIG. 1) from a client 104 (FIG. 1) executing a client application 157 (FIG. 1). In this example, the monitoring data 127 comprises image data 131 (FIG. 1) depicting an odometer of a vehicle, and image data 131 depicting a vehicle identification number (VIN) of a vehicle. Next, in box 204, the data extraction module 121 (FIG. 1) generates odometer data 141 (FIG. 1) from the image data 131. In some embodiments, this comprises applying an image recognition algorithm to the image data 131 to determine a numerical odometer reading embodied in the image data. Generating the odometer data 141 may also be performed by another approach.

The data extraction module 121 then generates a vehicle identifier 144 (FIG. 1) from the monitoring data 127 in box 207. In some embodiments, this comprises applying an image recognition algorithm to image data 131 to extract an alphanumeric vehicle identifier 144. In other embodiments, this comprises applying an algorithm to convert a visual encoding of a vehicle identifier 144 such as a QR code or barcode. The vehicle identifier 144 may also be generated from image data 131 by another approach.

In box 211, the verification module 124 (FIG. 1) verifies the authenticity of the monitoring data 127 by comparing the vehicle identifier 144 generated by the data extraction module to a vehicle identifier 144 defined in a user account 128 (FIG. 1). After the monitoring data 127 has been verified, the monitoring data 127 and the extracted odometer data 141 is stored with respect to an account 128. This may comprise creating or updating an entry in a database associated with the account 128, or taking some other action with respect to the account 128.

Figure 3:
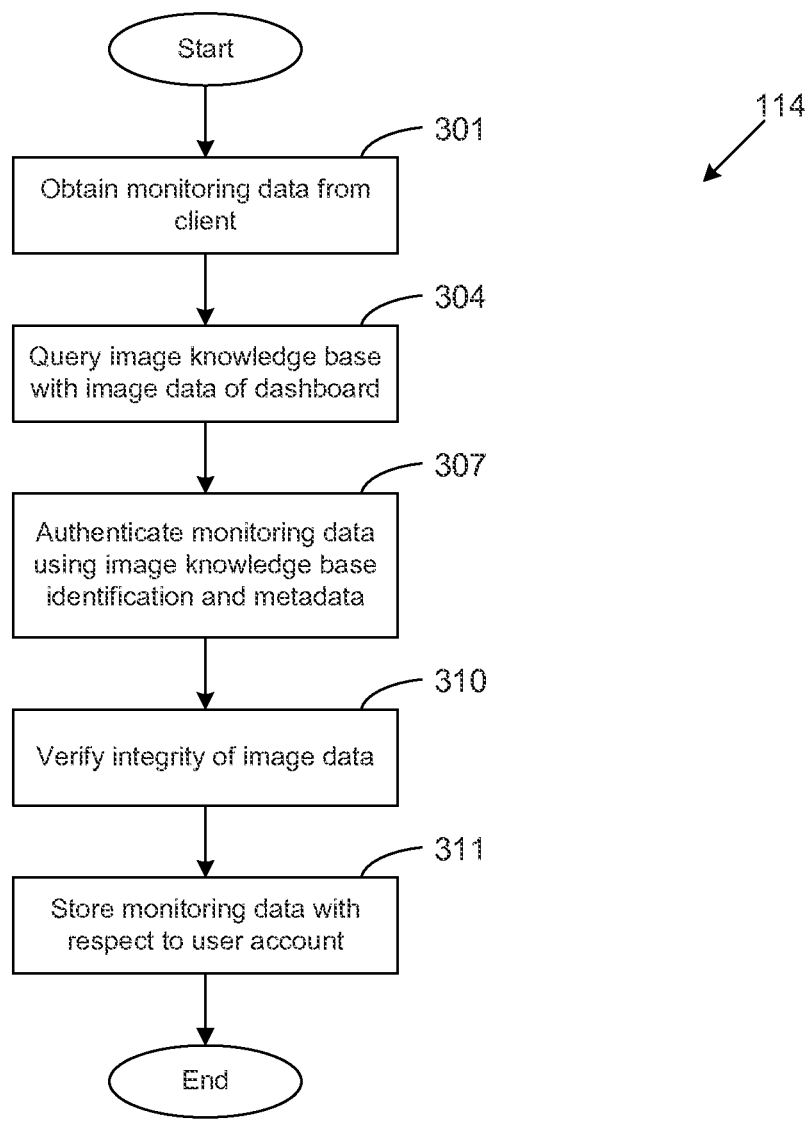
FIG. 3 is a flowchart illustrating one example of functionality implemented as portions of a data aggregation application executed in a computing environment in the networked environment of FIG. 1 according to various embodiments of the present disclosure.

Referring next to FIG. 3, shown is a flowchart that provides one example of the operation of a portion of the data aggregation application 114 (FIG. 1) according to various embodiments. It is understood that the flowchart of FIG. 3 provides merely an example of the many different types of functional arrangements that may be employed to implement the operation of the portion of the data aggregation application 114 as described herein. As an alternative, the flowchart of FIG. 3 may be viewed as depicting an example of steps of a method implemented in the computing environment 101 (FIG. 1) according to one or more embodiments.

Beginning with box 301, the data aggregation application 114 obtains monitoring data 127 (FIG. 1) via a network 107 (FIG. 1) from a client 104 (FIG. 1) executing a client application 151 (FIG. 1). The monitoring data 127 is associated with an account 128 (FIG. 1) indicated by the client 104. Furthermore, in this example, the monitoring data 127 comprises image data 131 capturing a dashboard of a vehicle and potentially other data. Next, in box 304, the verification module 124 (FIG. 1) queries an image knowledge base 147 (FIG. 1) with the image data 131 of the dashboard to identify a vehicle embodied in the image data 131 of the dashboard. In some embodiments, this comprises applying an image matching or machine learning algorithm to the image knowledge base 147. The image knowledge base 147 may be stored in a data store 111 (FIG. 1) accessible to the verification module 124, aggregated by executing a web crawler or other functionality, or accessible by some other approach. Querying the image knowledge base 147 may return a vehicle identifier 144 (FIG. 1), a make, model, or year of a vehicle, or potentially other data corresponding to a matching vehicle.

In box 307, the monitoring data 127 is authenticated with respect to the identified account 128 as a function of the image knowledge base 147 identification and metadata 134 (FIG. 1) encoded in the monitoring data 127. This may comprise, for example, determining if a vehicle embodied in the image knowledge base query 147 matches a vehicle defined in a vehicle identifier 144 (FIG. 1) of the account 128. This may further comprise comparing metadata 134 embodying client 104 characteristics to known client 104 attributes associated with the account 128. For example, this may comprise determining if the monitoring data 127 was generated from a client 104 connected to a predefined wireless carrier or matching a known hardware profile. Other approaches may also be used to authenticate the monitoring data 127.

In box 310, the verification module 124 verifies the integrity of the image data 131 by determining if the image data 131 was altered or otherwise modified prior to submission to the data aggregation application 114. This may comprise applying edge detection, artifact detection, pixel pattern detection, or other functions to the image data 131. This may also comprise analyzing metadata 134 associated with the image data 131 to determine if the image data 131 was saved or stored by an application known to have image editing or manipulation capabilities. The integrity of the image data 131 may also be verified by another approach.

Finally, in box 311, the monitoring data 127 is stored with respect to the indicated account 128. This may comprise updating or modifying a database entry associated with the account 128, or taking another action with respect to the account 128.

Figure 4:
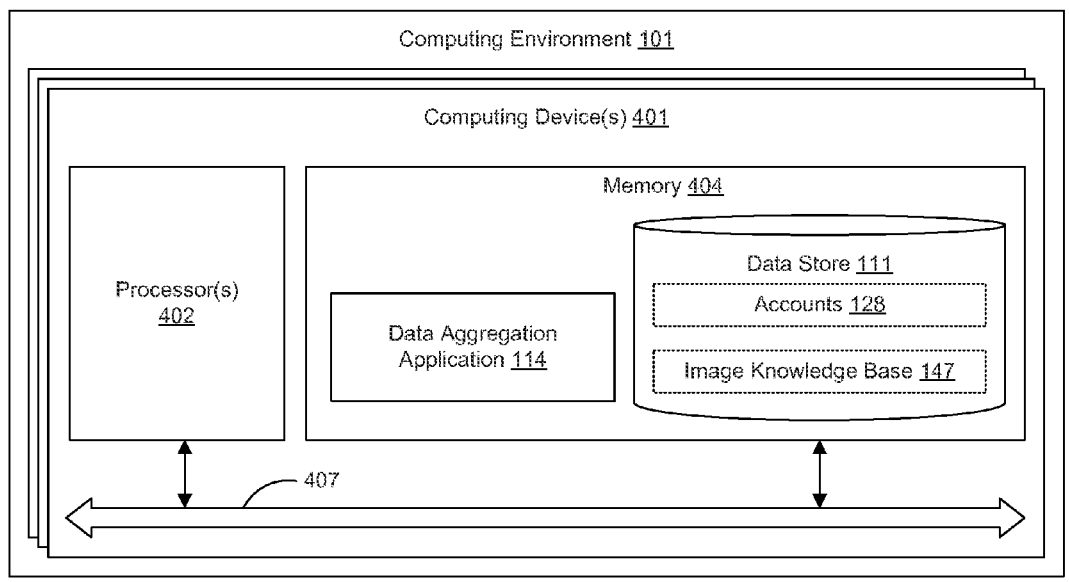
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a data aggregation application, and potentially other applications. Also stored in the memory 404 may be a data store 111 storing accounts 128, and an image knowledge base 147, and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one or more of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface

407 may comprise additional systems designed to coordinate this communication, including, for example, performing load balancing. The processor 402 may be of electrical or of some other available construction.

Although the data aggregation application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the data aggregation application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data aggregation application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
an application executable in the at least one computing device, the application comprising:
   logic configured to obtain, from a mobile device, a first at least one image data capturing an odometer display of a vehicle;
   logic configured to generate, from the first at least one image data, an odometer reading;
   logic configured to associate the odometer reading with the vehicle;
   logic configured to obtain, from the mobile device, a second at least one image data capturing a unique identifier associated with the vehicle;
   logic configured to verify that the vehicle corresponds to a vehicle identification as a function of the instrument panel captured in the at least one image data and the unique identifier captured in the second at least one image data; and
   wherein the unique identifier comprises a vehicle identification number (VIN), a Quick Response (QR) code, a barcode, or other human-readable or machine-readable image.

2. The system of claim 1, wherein the application further comprises:
   logic configured to obtain, from the mobile device, operational data associated with a usage of the vehicle; and
   logic configured to associate the operational data with the account vehicle.

3. The system of claim 1, wherein the application further comprises logic configured to determine whether the first at least one image data comprises altered or transformed image data.

4. The system of claim 1, wherein the application is a first application, and obtaining the first at least one image data is facilitated by a second application executed in the mobile device, and the application further comprises:
   logic configured to obtain, from the mobile device, user account data associated with the second application; and
   logic configured to verify that the first at least one image data embodies the odometer reading of a specified vehicle as a function of the user account data.

5. The system of claim 1, wherein the application further comprises:

logic configured to obtain, from the mobile device, metadata associated with a context during which the first at least one image data was generated; and logic configured to verify that the first at least one image data embodies the odometer reading of a specified vehicle as a function of the metadata.

6. The system of claim 5, wherein the application further comprises logic configured to verify the odometer reading as being greater than a temporally earlier odometer reading.

7. The system of claim 5, wherein the metadata comprises a wireless carrier identifier, one or more network identifiers, one or more cellular tower identifiers, or a global positioning system location.

8. The system of claim 1, wherein the logic configured to identify the vehicle as a function of the instrument panel captured in the first at least one image data further comprises logic configured to compare the first at least one image data to an image knowledge base facilitating an identification of the vehicle.

9. A method, comprising the steps of:
obtaining, by a computing device, from a mobile device, a first at least one image data capturing an instrument panel of a vehicle;

selecting, by the computing device, an account associated with the mobile device and a vehicle identification;

obtaining, by the computing device, from the mobile device, a second at least one image data capturing a unique identifier associated with the vehicle; and verifying, by the computing device, that the vehicle corresponds to the vehicle identification as a function of the instrument panel captured in the first at least one image data and the unique identifier captured in the second at least one image data; and wherein the unique identifier comprises a vehicle identification number (VIN), a Quick Response (QR) code, a barcode, or other human-readable or machine-readable image.

10. The method of claim 9, further comprising the steps of:
obtaining, by the computing device, from the mobile device, operational data associated with a usage of the vehicle; and associating, by the computing device, the operational data with the account.

11. The method of claim 9, further comprising the steps of:
obtaining, by the computing device, from the mobile device, login information associated with the account and an application executed in the mobile device; and wherein the verifying is further performed as a function of the login information.

12. The method of claim 9, further comprising the steps of:
obtaining, by the computing device, from the mobile device, metadata associated with a context during which the image data was generated; and wherein the verifying is further performed as a function of the metadata.

13. The method of claim 12, wherein the metadata comprises a mobile device identifier, an image resolution, or a software version.

14. The method of claim 12, wherein the metadata comprises a wireless carrier identifier, one or more network identifiers, one or more cellular tower identifiers, or a global positioning system location.

15. The method of claim 9, wherein the first at least one image data further captures an odometer, and the method further comprises:
generating, by the computing device, an odometer reading from the first at least one image data; and associating, by the computing device, the odometer reading with the account.

16. The method of claim 15, wherein the step of generating the odometer reading from the first at least one image data further comprises applying, by the computing device, an image recognition algorithm to the at least one image data.

* * * * *